(12) United States Patent
Tsurumi et al.

(10) Patent No.: US 9,692,032 B2
(45) Date of Patent: Jun. 27, 2017

(54) RECHARGEABLE BATTERY

(71) Applicant: Shin-Kobe Electric Machinery Co., Ltd., Tokyo (JP)

(72) Inventors: Naoko Tsurumi, Tokyo (JP); Akira Tanaka, Tokyo (JP); Murashi Shinto, Tokyo (JP); Yoshiki Miyamoto, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 246 days.

(21) Appl. No.: 14/411,283

(22) PCT Filed: Jun. 27, 2013

(86) PCT No.: PCT/JP2013/067700
§ 371 (c)(1),
(2) Date: Dec. 24, 2014

(87) PCT Pub. No.: WO2014/003136
PCT Pub. Date: Jan. 3, 2014

(65) Prior Publication Data
US 2015/0207129 A1    Jul. 23, 2015

(30) Foreign Application Priority Data
Jun. 28, 2012 (JP) .................................. 2012-145712

(51) Int. Cl.
*H01M 6/42* (2006.01)
*H01M 2/24* (2006.01)
(Continued)

(52) U.S. Cl.
CPC ............... *H01M 2/26* (2013.01); *H01M 2/06* (2013.01); *H01M 2/1673* (2013.01);
(Continued)

(58) Field of Classification Search
CPC ............ H01M 2/22; H01M 2/24; H01M 2/26; H01M 2/20; H01M 2/30; H01M 4/13
See application file for complete search history.

(56) References Cited

U.S. PATENT DOCUMENTS 4,646,430 A * 3/1987 Clarke .................. H01M 2/266
29/623.1
5,397,659 A * 3/1995 Imhof ................... H01M 2/266
29/623.4
(Continued)

FOREIGN PATENT DOCUMENTS

CN         1186348 A     7/1998
JP      2001-210303 A    8/2001
(Continued)

*Primary Examiner* — Patrick Ryan
*Assistant Examiner* — Julian Anthony
(74) *Attorney, Agent, or Firm* — Fitch, Even, Tabin & Flannery, LLP

(57) ABSTRACT

A thin film is used in a metallic collector in order to increase the volume energy density. However, the strength of the thin film is low, so when a negative plate or a positive plate is directly joined to a terminal base portion, even an insignificant load might cause damage, such as cutting of the metallic collector. Even in a structure where the metallic collector is joined to a highly-conductive plate-like metal or a highly-conductive plate-like resin, and where the collecting plate is joined to a terminal base portion, the connection between the collecting plate and the terminal base portion affects the battery properties. The present invention provides a rechargeable battery including an electrode group in which a metallic collector having a negative active material layer formed on a surface, a separator retaining an electrolyte, and another metallic collector having a positive active material layer formed on a surface are alternately disposed in a layered manner into a strip shape such that the separator is interposed between the two kinds of metallic collectors, and (Continued)

electrode plate tabs formed at ends of the two kinds of metallic collectors are joined to each of metallic collecting plates by a predetermined number, and the metallic collecting plates are joined together with pressing plates, by fitting between a bolt and a nuts, to a terminal base portion having a through-hole for the bolt.

14 Claims, 13 Drawing Sheets

(51) Int. Cl.
| | | |
|---|---|---|
| *H01M 4/02* | (2006.01) | |
| *H01M 4/13* | (2010.01) | |
| *H01M 2/26* | (2006.01) | |
| *H01M 2/16* | (2006.01) | |
| *H01M 2/06* | (2006.01) | |
| H01M 10/04 | (2006.01) | |
| H01M 10/052 | (2010.01) | |
| H01M 10/0585 | (2010.01) | |

(52) U.S. Cl.
CPC ........ *H01M 2/266* (2013.01); *H01M 10/0413* (2013.01); *H01M 10/0463* (2013.01); *H01M 10/052* (2013.01); *H01M 10/0585* (2013.01)

(56) References Cited

U.S. PATENT DOCUMENTS

| | | | | |
|---|---|---|---|---|
| 5,871,861 | A | * | 2/1999 | Hirokou ............ H01M 2/20 429/149 |
| 2012/0115021 | A1 | | 5/2012 | Yotsumoto |
| 2012/0148913 | A1 | | 6/2012 | Chiba |

FOREIGN PATENT DOCUMENTS

| | | |
|---|---|---|
| JP | 2003-257408 A | 9/2003 |
| JP | 2005005215 A | 1/2005 |
| JP | 2005-294150 A | 10/2005 |
| JP | 2006-338979 A | 12/2006 |
| JP | 2009-087612 A | 4/2009 |
| JP | 2010-205546 A | 9/2010 |
| JP | 2011-165620 A | 8/2011 |
| JP | 2012-104226 A | 5/2012 |

* cited by examiner

RECHARGEABLE BATTERY

TECHNICAL FIELD

The present invention relates to a rechargeable battery.

BACKGROUND ART

In recent years, with the expansion of the application of rechargeable batteries, such as lithium-ion batteries, a larger capacity and a higher energy density have been required, so that a layered battery suitable for the achievement of a higher volume energy density has been selected in a battery structure required having a large capacity.

A rechargeable battery is constituted by a metallic collector having a negative active material layer formed on the surface (hereinafter referred to as negative plate), a separator retaining an electrolytic solution, and the other metallic collector having a positive active material layer formed on the surface (hereinafter referred to as positive plate), and it is necessary to perform electrical connection between a positive electrode terminal and a negative electrode terminal and an electrode group composed of the negative plate, the separator, and the positive plate.

PRIOR ART DOCUMENTS

Patent Documents

Patent Document 1: Japanese Patent Application Laid-Open No. 2005-005215
Patent Document 2: Japanese Patent Application Laid-Open No. 2006-338979
Patent Document 3: Japanese Patent Application Laid-Open No. 2010-205546
Patent Document 4: Japanese Patent Application Laid-Open No. 2005-294150

DISCLOSURE OF THE INVENTION

Problems to be Solved by the Invention

Since the metallic collector, unlike the active material, does not directly contribute to charging and discharging reactions, a thin film is used in the metallic collector in view of the volume energy density. However, the strength of the thin film is low, so when the negative plate or the positive plate is directly joined to a terminal base portion, even an insignificant load might cause damage such as cutting of the metallic collector. Therefore, a measure is taken that the metallic collector is joined to a highly-conductive plate-like metal or a highly-conductive plate-like resin (hereinafter referred to as collecting plate), and then the collecting plate is joined to the terminal base portion. In such a structure that connects the metallic collector and the terminal base portion via the collecting plate, the connection between the collecting plate and the terminal base portion affects the battery properties and the connection is therefore an important point.

In Patent Document 1, in particular, in claim 1 therein, when a collecting plate and a terminal base portion are fixed to each other, a bolt is screwed into the terminal base portion, and further the bolt and the terminal base portion are welded to each other. This method carries a risk that metallic powder generated by welding might gain entrance to a layer group, or a risk that sparks by welding might damage a separator.

Further, in Patent Document 1, in particular, in claim 3 therein, a collecting plate and a terminal base portion are fixed by screwing a bolt having a flange into them. Therefore, a force to fix the collecting plate to the terminal base portion might be one-sided in the periphery of the flange. When the force is one-sided, it might cause a deformation of the collecting plate, resulting in electrically non-uniform connection. Such electrically non-uniform connection causes a variation in resistance, and therefore large-current charge or discharge might be unsafe because a terminal portion might locally have a high temperature due to resistance heat generation.

Means for Solving the Problems

As means for solving the above-described problems, the following constitution is possible.

A rechargeable battery includes an electrode group in which a metallic collector having a negative active material layer formed on a surface, a separator retaining an electrolyte, and another metallic collector having a positive active material layer formed on a surface are alternately disposed in a layered manner into a strip shape such that the separator is interposed between the two kinds of metallic collectors, and electrode plate tabs formed at ends of the two kinds of metallic collectors are joined to each of metallic collecting plates by a predetermined number, and two or more of the metallic collecting plates are joined together with metallic pressing plates, by fitting between a metallic bolt having a circular bolt flange and a bolt shaft portion of which a cross-section is circular and two metal nuts, to a terminal base portion having two or more through-holes for the metallic bolt.

In addition, when considered from another point of view, the following constitutions are also possible.

A rechargeable battery including an electrode group in which a metallic collector having a negative active material layer formed on a surface, a separator retaining an electrolyte, and another metallic collector having a positive active material layer formed on a surface are alternately disposed in a layered manner into a strip shape such that the separator is interposed between the two kinds of metallic collectors, and electrode plate tabs formed at ends of the two kinds of metallic collectors are joined to each of collecting plates by a predetermined number, and the collecting plates are joined together with pressing plates, by fitting between a bolt and a nut, to a terminal base portion having a through-hole for the bolt.

In this regard, two or more of the nuts are used for the one bolt.

Further, materials of the collecting plates and the pressing plates are a metal or a highly-conductive resin.

Two or more of the collecting plates are joined to the terminal base portion by fitting between the bolt having a bolt flange and a bolt shaft portion and the nut.

A shape of the bolt flange is circular or polygonal, and a cross-sectional shape of the bolt shaft portion is circular or polygonal.

A diameter of a contacting surface between the bolt shaft portion and the collecting plate is narrower than a diameter of a contacting surface between the bolt shaft portion and the terminal base portion.

A shape of a bolt-shaft narrowed portion that is a contacting surface between the bolt shaft portion and the collecting plate is a shape having tapers.

A shape of the bolt shaft portion is a circular shape or a shape having one or more corners.

A fastening member including the bolt and the nut is made of a metal, or a resin of high conductivity and high strength.

A shape of a through-hole for the bolt is any of a circular shape, an elliptical shape, a polygonal shape having five or more corners, or a cross-like shape.

A shape of a through-hole for the bolt is a long or short shape in one direction or in a plurality of directions.

A diameter of a through-hole for the bolt is 1.2 or more times larger than a diameter of the bolt shaft portion.

A cross-sectional area of a through-hole for the bolt in the contacting surface is equal to or less than one half of an area of the contacting surface.

A thickness of the pressing plate in a direction through which the bolt passes is 1 mm or more and 10 mm or less.

The number of through-holes for the bolt disposed in the pressing plate is two or more, and an area of through-holes for the bolt is equal to or less than one half of an area of the pressing plate.

Effects of the Invention

According to the present invention, since welding means is not used to join upper portions inside a battery can (namely, a terminal base portion, a collecting plate, a bolt, and a nut), it is unnecessary to worry about sparks generated during welding, and there is no possibility of damage of a separator, contamination of metallic impurities, or the like. Therefore, it is possible to provide a battery free from the risk of intense short-circuiting and sudden heat generation/ignition/explosion or the like inside the battery can.

BRIEF DESCRIPTIONS OF THE DRAWINGS

BEST MODE FOR CARRYING OUT THE INVENTION (Production of Electrodes)

As far as the present invention is concerned, it is unnecessary to prepare a special electrode and, for example, an electrode produced by means disclosed in Patent Document 2 is sufficient.

(Production of Electrolytic Solution)

As far as the present invention is concerned, it is unnecessary to prepare a special electrolytic solution and, for example, an electrolytic solution produced by means disclosed in Patent Document 3 is sufficient.

(Production of Layered Electrode)

As far as the present invention is concerned, it is unnecessary to prepare a special layered electrode and, for example, a layered electrode produced by means disclosed in Patent Document 4 is sufficient.

An electrode, an electrolytic solution, and a layered electrode thus produced or prepared are used to produce a battery.

EMBODIMENTS

Preferred embodiments of the present invention will be described in detail with reference to the drawings.

First Embodiment

Figure 1:
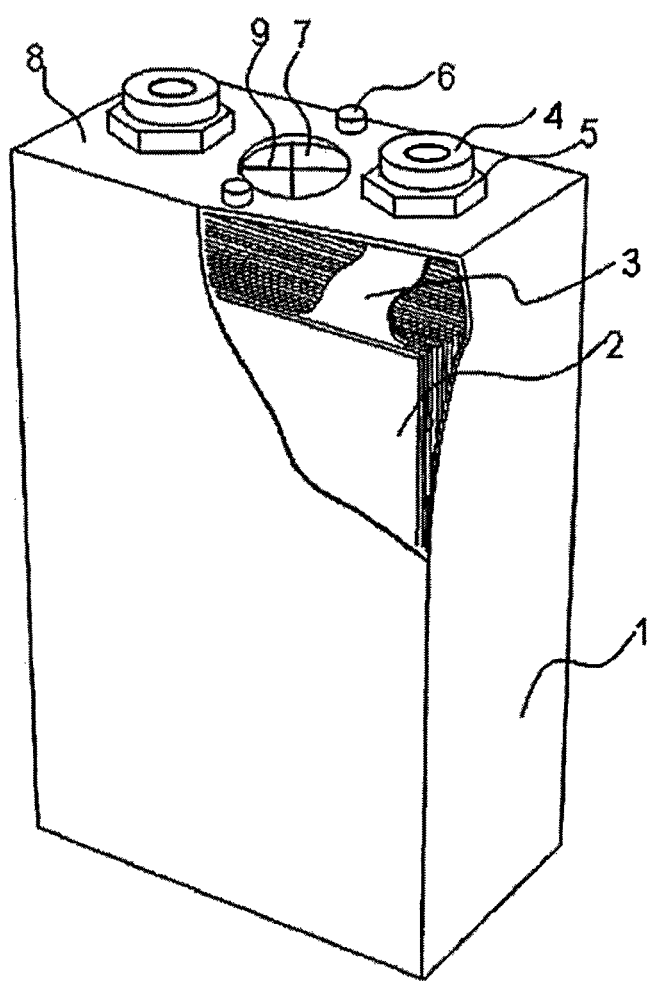
FIG. 1 is a fractured perspective view of a battery explaining an embodiment of the present invention.

In FIG. 1, a layered body 2 is constituted by layering a metallic collector (copper) having a negative active material layer formed on the surface, a separator retaining a non-aqueous solvent (hereinafter referred to as electrolyte) in which lithium salt is dissolved, and the other metallic collector (aluminum) having a positive active material layer formed on the surface alternately into a strip shape. The dimension of the layered body 2, such as thickness, and the number of layers thereof, are determined depending on a required battery capacity. In the first embodiment, the number of layers is 524, but it is not limited to this number, and in the case of a battery having a battery capacity of 100 Ah, the number of layers needs to be about 200 to 600.

As well as being highly conductive, the collector is required to be strong so as not to be easily fractured during a series of operations for manufacturing a battery, the series of operation by production of electrode plates, such as applying and drying an coating-like electrode mixture (hereinafter referred to as slurry) produced by mixing an electrode active material (in the first embodiment, spinel manganese), a conducting agent (in the first embodiment, graphite) and a binder (in the first embodiment, PVDF), production of an electrode group, insertion of the electrode group into a battery can, and joining of an electrode plate tab and a collecting plate, and during transportation, installation, sale, usage, or the like, and under a load such as vibration involved. The thickness of the collector is desired to be 5 μm or more and 50 μm or less because, if the thickness is thinner than 5 μm, the collector is easily damaged in the manufacturing process for a battery, and, if the thickness exceeds 50 μm, the volume density of a battery significantly decreases. In the first embodiment, an aluminum foil having a thickness of 20 μm was used for the positive electrode, and a copper foil having a thickness of 10 μm was used for the negative electrode.

An electrode plate tab 3 for electrical connection is formed at an end, in a longitudinal direction, of the collector that is a constituent material of the layered body 2. The number of collectors formed in the layered body 2 was 524 in the first embodiment, but the number is not limited to 524, but depends on the battery capacity, and, in the case of a battery having a capacity of several ten Ah to several hundred Ah, the number ranges from several tens to several hundreds.

A fastening member 5 is constituted by a plurality of fastening members, such as a nut 13, a washer, or a bolt 12. In the first embodiment, a fastening member made of aluminum was used, but the material of the fastening member 5 is not limited to aluminum, but may be a metal, such as iron or nickel, or even a resin as long as the resin is a material having a conductivity or strength that do not cause a significant degradation in the battery properties.

A conducting member 4 are constituted by secondary conducting members such as external output terminals of the positive electrode and the negative electrode, the collecting plate 10 joined to the electrode plate tabs 3, pressing plates 14 pressing the tab collecting plates against the external output terminals, and the metallic fastening members such as the nut 13, the washer, or the bolt 12, and the conducting member 4 refers to such members or the like that are electrically connected. The external output terminals of the positive electrode and the negative electrode are roughly divided into a terminal main body portion exposed to the outside from the battery container (battery can) 1 and the terminal base portion 16 housed in the battery can.

It should be noted that the conducting member 4 and a lid plate 8 are electrically insulated from each other.

The electrolytic solution is filled through a solution filling port opened in the lid plate 8, and the solution filling port is sealed with a solution filling plug 6.

A safety valve 7 is disposed in the lid plate 8. In a circular stainless steel thin plate, a groove pattern 9 is formed on the lid plate 8 by etching so that it starts to be fractured from the groove portion under a predetermined pressure and the safety valve 7 opens along the groove pattern 9. The method of forming the groove of the safety valve 7 is not only by etching, but the groove may be formed by pressurization or the groove may be formed by a laser or cutting work. The method of forming the groove is not limited to a specific method. In addition, the safety valve 7 was joined to the lid plate 8 by laser welding. The method of forming the safety valve 7 in the lid plate 8 is not limited to laser welding, but the safety valve 7 can be formed directly in the lid plate 8 by mechanical means, such as cutting or pressing. Further, the material of the safety valve 7 is not limited to stainless steel, but may also be aluminum, nickel, a fluorine-based resin, or a resin such as polyethylene or polypropylene, and can be selected from materials that are impervious to water and that are the same as the material of the lid plate or are easily joined to the material of the lid plate.

The groove pattern 9 of the safety valve 7 is an X shape, but not limited to the X shape as long as the shape is fractured under a predetermined pressure.

In addition, in the first embodiment, the safety valve 7 is described as a single valve, but the number of safety valves is not particularly limited.

Further, in the first embodiment, the safety valve 7 is disposed on a central line of the lid plate 8, but the position of the safety valve 7 can be optionally determined.

Second Embodiment

Figure 2:
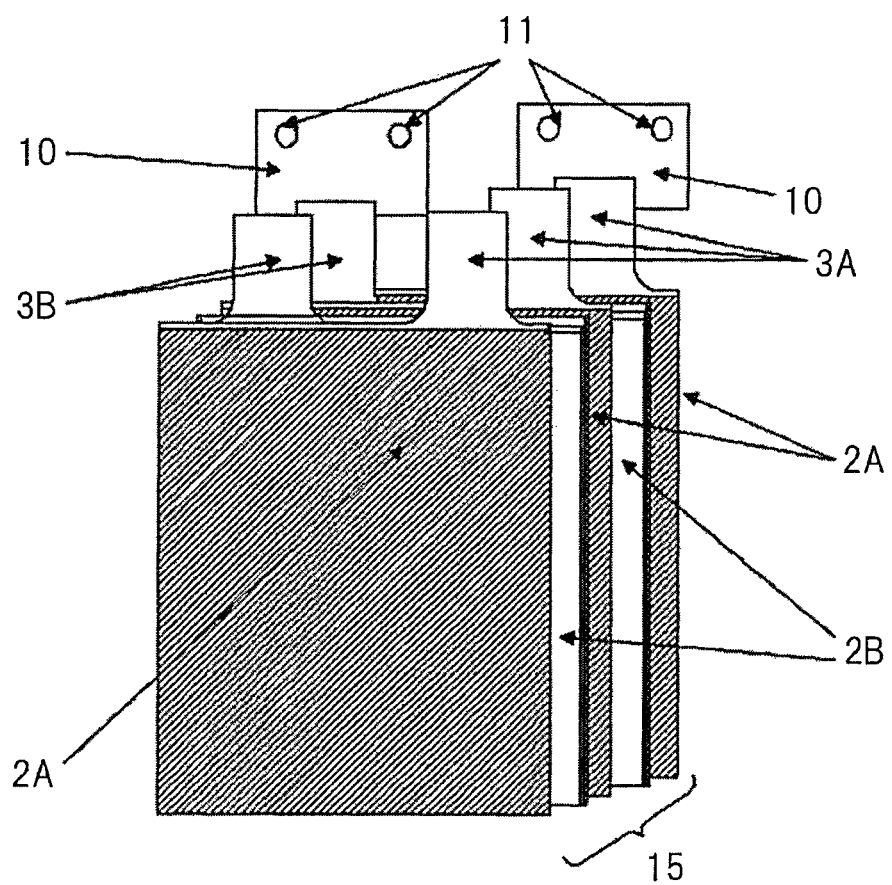
FIG. 2 is a view illustrating a relationship between positive plates and negative plates and collecting plates layered on top of another.
Figure 3:
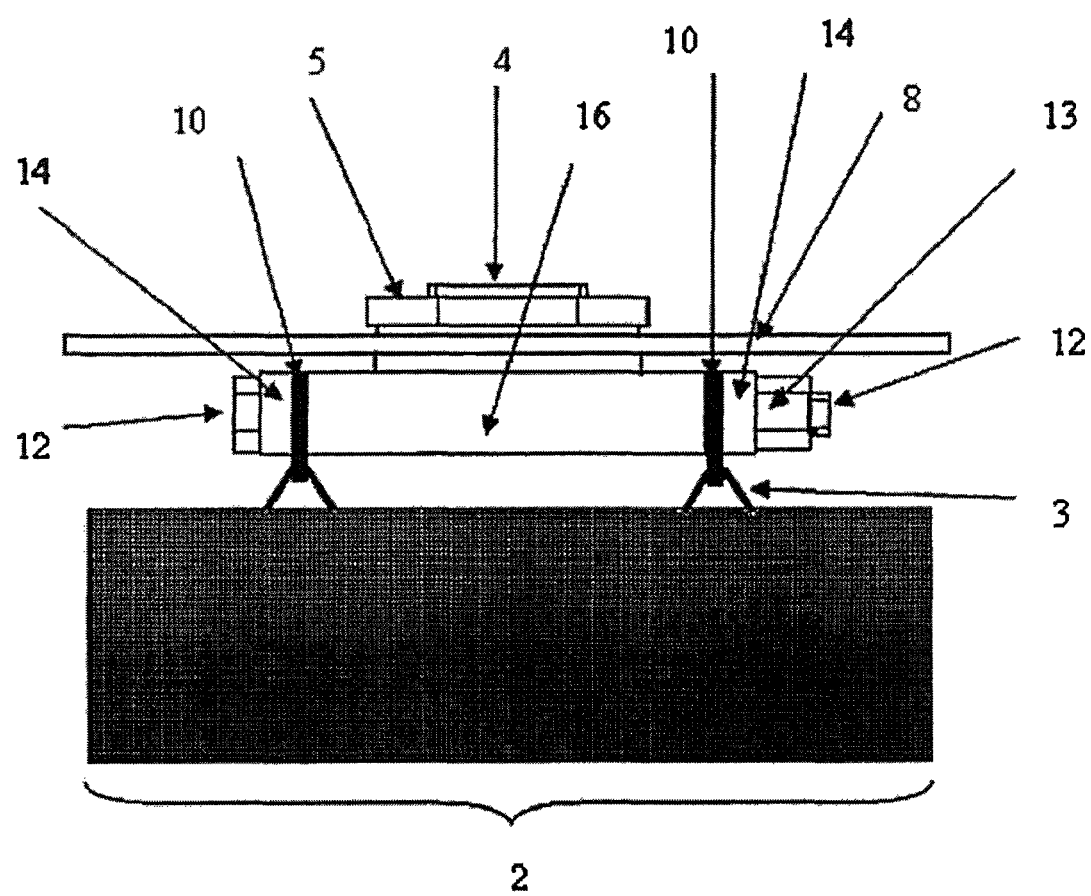
FIG. 3 is a view showing one example of a joining structure of the collecting plates to a terminal base portion.

As shown in FIG. 2, a plurality of negative plates 2A and positive plates 2B are layered so as to face each other across a separator (not shown), and form an electrode group 15 together. In addition, as shown in FIG. 3, the electrode group 15 is constituted such that the layers at both ends are the negative plates 2A, between which the negative plate 2A and the positive plate 2B are alternately layered.

In addition, as shown in FIG. 2, a negative plate tab 3A and a positive plate tab 3B are disposed away from each other in left and right directions so as not to overlap with each other.

Figure 4:
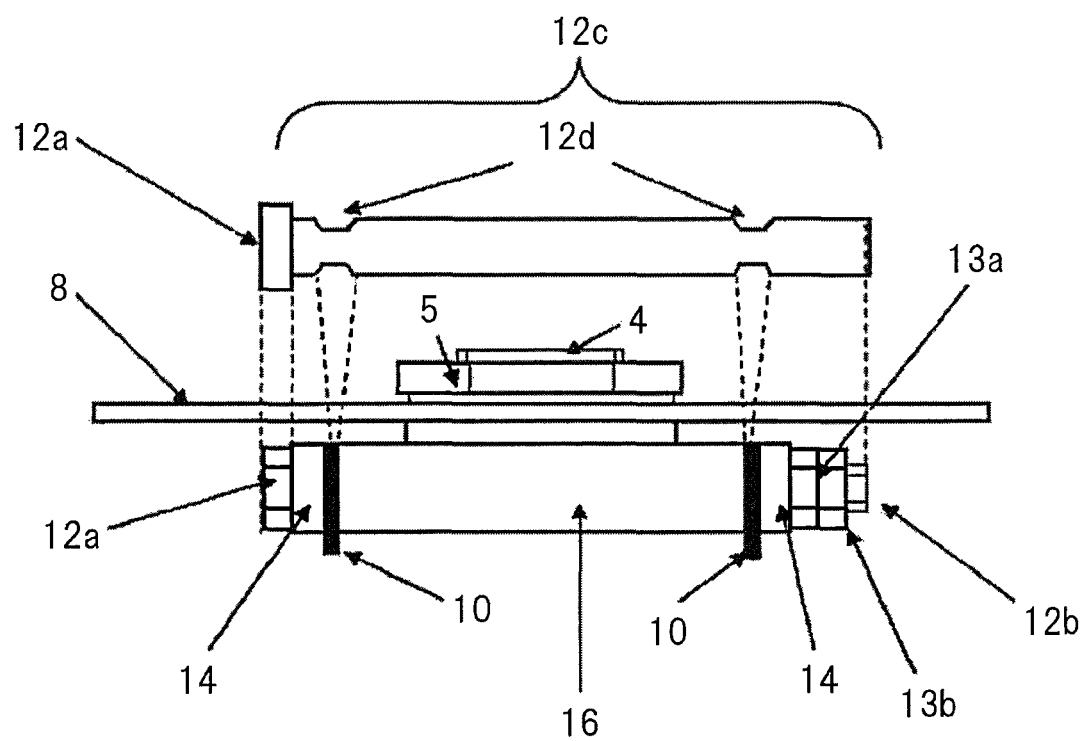
FIG. 4 is a view showing one example of a joining structure of a bolt to a terminal base portion.

The negative plate tab 3A and the positive plate tab 3B of the electrode group 15 are joined, by resistance welding, to metallic plates (collecting plates 10) having a high conductivity. From both sides of the terminal base portion 16 as shown in FIG. 3, the plurality of collecting plates 10 joined to a predetermined number of negative plate tabs 3A and positive plate tabs 3B are fixed with the bolts 12 and the nuts 13 via a highly-conductive metallic pressing plate 14. However, the number of nuts is not limited to one for each bolt, but, as shown in FIG. 4, two or more nuts, like a nut 13a and a nut 13b, may be used for each bolt.

The collecting plate 10 is a metallic plate having a high conductivity, for example, a nickel plate or an aluminum plate, but such metal as iron or copper can also be utilized. In addition, a resin thin plate may be used as long as the plate has as high conductivity as metal. The collecting plate 10 is required to have a thickness that can accept current flowing between the electrode plate tab 3 welded thereto and the terminal base portion 16, and to have a strength that prevents fracturing due to welding with the electrode plate tab 3 or fastening with the bolt 12 and the nut 13. It is also important that the thickness does not cause a significant reduction in the volume energy density of the battery even when a plurality of collecting plates 10 are stacked. When ten negative plate tabs 3A were fixed to a 50 μm-thick copperplate by resistance welding and similarly ten collecting plates 10 were fixed to the terminal base portion 16 with the bolt 12 and the nut 13, deformation and damage were seen in the collecting plate 10. Further, when the same test was performed with 5000 μm-thick copper plates, these plates were unable to be accommodated in the battery container 1, so that the size of the battery can 1 was required to be increased. When the size of the battery can 1 was increased so that the battery can 1 could accommodate a plurality of 5000 μm-thick copper collecting plates 10, the volume energy density of the battery was significantly reduced. For this reason, the thickness of the collecting plate 10 is desired to be 50 μm or more and 5000 μm or less. In the second embodiment, a 200 μm-thick aluminum plate was used for the positive electrode, and a 200 μm-thick nickel plate was used for the negative plate.

The collecting plate 10 has the shape of a plate having a bolt through-hole 11. Though an example of the collecting plate 10 having two bolt through-holes 11 is shown in FIGS.

2 and 7, the number of bolt through-holes 11 is not limited to two, but may be three or more unless contact resistance is significantly increased by a reduction in a surface (hereinafter referred to as contacting surface) where the collecting plate 10 is in contact with the terminal base portion 16 and the collecting plates 10 are in contact with each other, depending on the strength of the collecting plate 10 and the fastening state of the bolt 12 and the nut 13. The bolt through-holes 11 are positioned so as not to be in contact with joining portions of the negative plate tab 3A and the positive plate tab 3B of the terminal base portion 16 when the collecting plate 10 is fixed to the terminal base portion 16 with the bolt 12 and the nut 13. Further, in order to prevent force applying to the contacting surface from being one-sided, the centers of the bolt through-holes 11 are substantially uniformly disposed in the longitudinal direction. It should be noted that the bolt through-holes 11 never overlap with each other. In the case of one bolt through-hole 11, when the collecting plate 10 was fixed to the terminal base portion 16, the layers are easily displaced, and further the force due to fastening of the bolt 12 and the nut 13 was one-sided, the collecting plate 10 was deformed, the contacting surfaces between the collecting plates 10 and between the collecting plate 10 and the terminal base portion 16 were one-sided and reduced, and heat generation due to increase in resistance or current concentration was seen. Further, in the contact surface, when one half of the area of the contacting surface was lost by the bolt through-holes 11, a contacting area effective for conducting was reduced, so that a resistance at a fixed portion between the collecting plate 10 and the terminal base portion 16 by the bolt 12 and the nut 13 was increased. A reduction in the strength of the collecting plate 10 was also seen. It was therefore found that the cross-sectional area of the bolt through-holes 11 in the contacting surface is desired to be equal to or less than one half of the area of the contacting surface.

The pressing plate 14 is made of a metallic or resin plate, and required to have a strength that prevents a significant deformation or damage due to fastening with the bolt 12 and the nut 13, and to have a thickness that prevents a significant reduction in the volume energy density of the battery. When a 500 μm-thick copper plate was used to fix a plurality of collecting plates 10 to the terminal base portion 16 with the bolt 12 and the nut 13, a deformation of the pressing plate 14 due to fastening with the bolt 12 and the nut 13 was seen. Further, when a 20 mm-thick pressing plate 14 was used to perform the same examination, no deformation of the pressing plate 14 was seen, but the volume energy density of the battery was significantly reduced. When the same examination was performed with a 20 μm-thick copper plate having a plurality of holes in order to prevent a reduction in the volume energy density, the strength of the pressing plate 14 was reduced. Though the thickness of the pressing plate 14 differs depending on the material and the fastening strength, it was found to be preferable in the second embodiment that the thickness of the pressing plate 14 is 1 mm or more and 10 mm or less. In the second embodiment, a 5-mm aluminum plate was used for the positive electrode, and a 5-mm copper plate for the negative plate.

The pressing plate 14 has bolt through-holes 11 through which the bolts 12 pass, and indicates a higher rigidity than the collecting plate 10, and therefore a change of the shape of the pressing plate 14 due to fastening with the bolt 12 and the nut 13 is smaller than that of the collecting plate 10.

The bolt through-holes 11 are disposed such that the centers of the bolt through-holes 11 are substantially uniformly positioned in the longitudinal direction, and such that a surface that faces the lid plate 8 is equal in height to a surface that faces the lid plate 8 of the terminal base portion 16 in the height direction of the battery (when the battery is placed with the conducting member 4 up) when being fixed to the terminal base portion 16. In the case of one bolt through-hole 11, the layers were easily displaced when the collecting plate 10 was fixed to the terminal base portion 16, in addition, the force due to fastening with the bolt 12 and the nut 13 was one-sided, the contacting surfaces between the collecting plates 10 and between the collecting plate 10 and the terminal base portion 16 were reduced, and an increase in resistance and current concentration on the contacting surface and the heat generation therefrom were seen. Further, in a surface where the pressing plate 14 was in contact with the collecting plate 10 (hereinafter referred to as pressing surface), when one half of the area of the pressing surface was lost by the bolt through-hole 11, the area was reduced, so that a reduction in strength was seen. Therefore, it was found that the number of bolt through-holes 11 in the pressing plate 14 was desired to be two or more, and that the occupation area of the bolt through-hole 11 in the pressing surface was desired to be equal to or less than one half of the area of the pressing surface.

The pressing plate 14 and the collecting plate 10 are connected with each other by inserting the bolt 12 into the bolt through-hole 11 provided in the terminal base portion 16 and fastening the bolt 12 with the nut 13.

In the bolt 12, as shown by 12c in FIG. 4 and FIG. 5, a diameter of a bolt shaft portion (a bolt shaft portion which faces at least the bolt through-hole 11 of the collecting plate 10 when the terminal base portion 16 and the collecting plate 10 are joined to each other with the bolt 12 and the nut 13, and which is hereinafter referred to as contacting surface between the bolt shaft portion and the collecting plate 10) is partially narrower than the bolt shaft portion which faces the terminal base portion 16 (hereinafter referred to as contacting surface between the bolt shaft portion and the terminal base portion 16), so that displacement of the collecting plates 10 occurring when a plurality of collecting plates 10 are stacked is prevented. In the second embodiment, a diameter of the bolt shaft portion (the bolt shaft portion which faces at least the bolt through-hole 11 of the collecting plate 10 when the terminal base portion 16 and the collecting plate 10 are joined to each other with the bolt 12 and the nut 13) that is partially narrower than the bolt shaft portion 12c which faces the terminal base portion 16 is hereinafter referred to as a bolt-shaft narrowed portion 12d.

Third Embodiment

Figure 5:
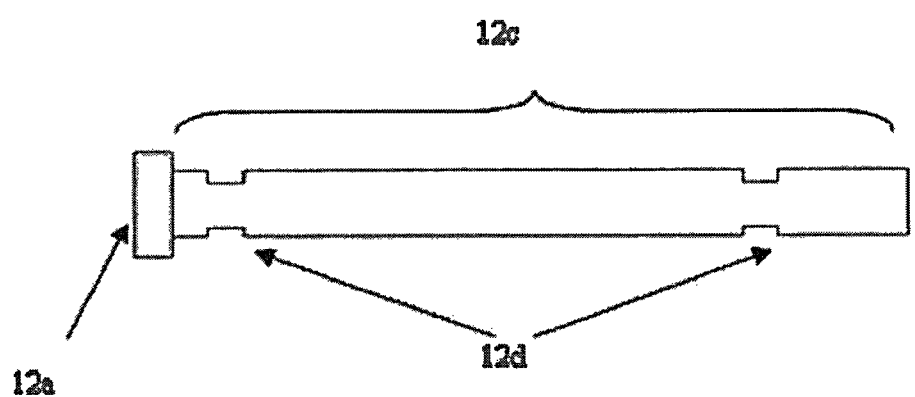
FIG. 5 is a view showing one example of an appearance of the bolt.

Though having tapers in FIG. 4, the shape of the bolt-shaft narrowed portion 12d is not limited to the shape having tapers, but the bolt-shaft narrowed portion 12d may be the shape in which the bolt shaft portion 12c facing at least the bolt through-hole 11 of the collecting plate 10 is narrowed and does not have tapers when the terminal base portion 16 and the collecting plate 10 are joined to each other with the bolt 12 and the nut 13, as shown in FIG. 5.

FIG. 4 to FIG. 9 show the shapes of the bolt 12.

In FIG. 4, the bolt shaft portion 12c facing the bolt through-hole 11 of the collecting plate 10 is uniformly narrowed, and has tapers, so that displacement occurring when the collecting plates 10 are stacked is widely prevented, and the bolt 12 can smoothly be inserted into, or extracted from, the bolt through-hole 11 of the collecting plate 10, and further, the collecting plates 10 into which the bolt 12 is inserted are easily retained at the narrowed part of a diameter of the bolt shaft portion 12c.

Fourth Embodiment

In FIG. 5, the bolt shaft portion 12c facing the bolt through-hole 11 of the collecting plate 10 is uniformly narrowed, but does not have tapers, so that displacement when the collecting plates 10 are stacked is prevented in any direction, and further, the collecting plates 10 are easily retained at the narrowed part of a diameter of the bolt shaft portion 12c after the bolt 12 is inserted into the bolt through-hole 11 of the collecting plate 10.

Fifth Embodiment

Figure 6:
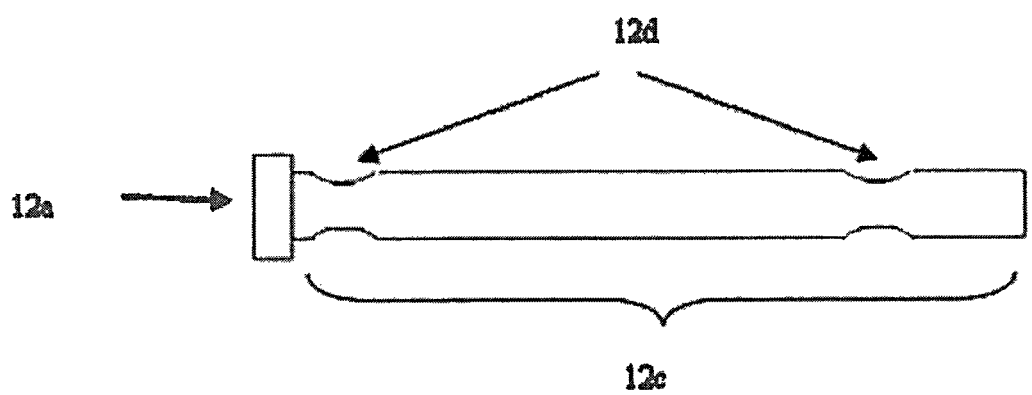
FIG. 6 is a view showing one example of the appearance of the bolt.

In FIG. 6, the bolt shaft portion 12c facing the bolt through-hole 11 of the collecting plate 10 is uniformly narrowed, and further, the change in the diameter of the bolt shaft portion 12c is gentle, so that displacement when the collecting plates 10 are stacked is prevented in any direction, and the bolt 12 can smoothly be inserted into, or extracted from, the bolt through-hole 11 of the collecting plate 10.

Sixth Embodiment

Figure 7:
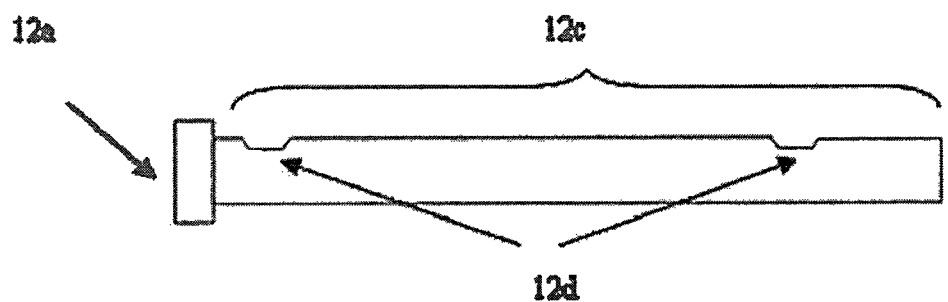
FIG. 7 is a view showing one example of the appearance of the bolt.

In FIG. 7, a diameter of the bolt shaft portion 12c facing the bolt through-hole 11 of the collecting plate 10 is partially narrowed, so that, when the terminal base portion 16 and the collecting plate 10 are joined to each other with the bolt 12 and the nut 13, the bolt shaft portion 12c is thicker than when a diameter of the bolt shaft portion 12c facing the bolt through-hole 11 of the collecting plate 10 is uniformly-narrowed, which results in obtaining higher strength easily. Further, since the tapers are provided, the bolt 12 can smoothly be inserted into, or extracted from, the bolt through-hole 11 of the collecting plate 10.

Seventh Embodiment

Figure 8:
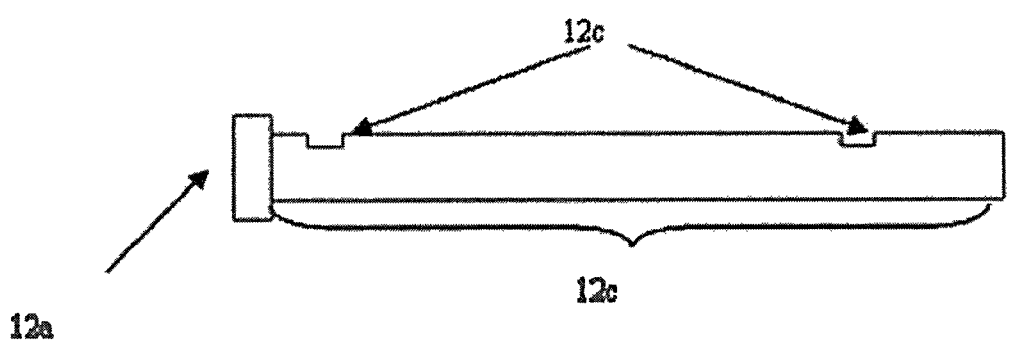
FIG. 8 is a view showing one example of the appearance of the bolt.

In FIG. 8, a diameter of the bolt shaft portion 12c facing the bolt through-hole 11 of the collecting plate 10 is partially narrowed, so that, when the terminal base portion 16 and the collecting plate 10 are joined to each other with the bolt 12 and the nut 13, the bolt shaft portion 12c is thicker than when a diameter of the bolt shaft portion 12c facing the bolt through-hole 11 of the collecting plate 10 is uniformly-narrowed, which results in obtaining higher strength, and since the shape does not have tapers, the collecting plates 10 are easily retained at the narrowed part of a diameter of the bolt shaft portion 12c after the bolt 12 is inserted into the bolt through-hole 11 of the collecting plate 10.

Eighth Embodiment

Figure 9:
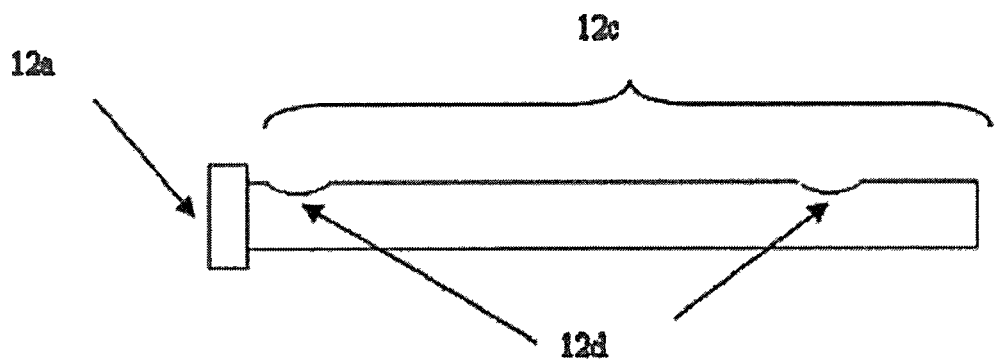
FIG. 9 is a view showing one example of the appearance of the bolt.

In FIG. 9, when the terminal base portion 16 and the collecting plate 10 are joined to each other with the bolt 12 and the nut 13, a diameter of the bolt shaft portion 12c facing the bolt through-hole 11 of the collecting plate 10 is partially narrowed, so that, when the terminal base portion 16 and the collecting plate 10 are joined to each other with the bolt 12 and the nut 13, the bolt shaft portion 12c is thicker than when a diameter of the bolt shaft portion 12c facing the bolt through-hole 11 of the collecting plate 10 is uniformly-narrowed, which results in obtaining higher strength easily. In addition, the change in the diameter of the bolt shaft portion 12c is gentle, so that the bolt 12 can smoothly be inserted into, or extracted from, the bolt through-hole 11 of the collecting plate 10.

As shown in FIG. 4, the most preferred bolt is one in which the bolt the shaft portion 12c facing the bolt through-hole 11 of the collecting plate 10 is uniformly narrowed and has tapers, and the next preferred bolt is one having such a shape as shown in FIG. 5 in which the bolt shaft portion 12c facing the bolt through-hole 11 of the collecting plate 10 is uniformly narrowed but does not have tapers, or such a shape as shown in FIG. 6 in which the bolt shaft portion 12c facing the bolt through-hole 11 of the collecting plate 10 is uniformly narrowed and a change in the diameter of the bolt shaft portion 12c is gentle.

Ninth Embodiment

The cross-sectional shapes of a bolt flange 12a and the bolt shaft portion 12c are not limited to a circular shape. FIG. 10 to FIG. 17 show examples of the cross-sectional shapes of the bolt flange 12a and the bolt shaft portion 12c, and of the shape of the bolt shaft portion 12c facing the bolt through-hole 11 of the collecting plate 10 when the terminal base portion 16 and the collecting plate 10 are joined to each other with the bolt 12 and the nut 13.

A contacting surface 12e between the bolt shaft portions 12c and the terminal base portions 16 in FIG. 10 to FIG. 17 is an abutting part of the bolt shaft portion 12c facing the terminal base portion 16. Further, a contacting surface 12f between the bolt shaft portion 12c and the collecting plate 10 in FIG. 10 to FIG. 17 is an abutting part of the bolt shaft portion 12c facing at least the bolt through-hole 11 of the collecting plate 10 when the terminal base portion 16 and the collecting plate 10 are joined to each other with the bolt 12 and the nut 13.

Figure 10:
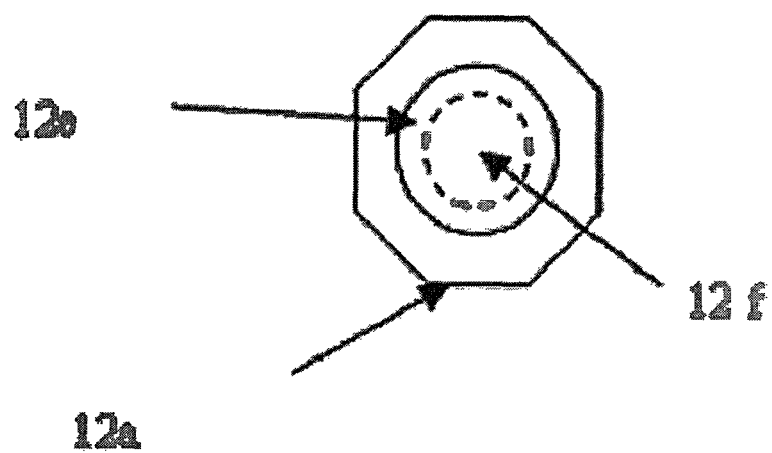
FIG. 10 is a view showing one example of a cross-section of the bolt.

FIG. 10 shows the bolt 12 in which the bolt flange 12a is polygonal and in which the cross-sectional shape of the bolt shaft portion 12c facing the bolt through-hole 11 of the collecting plate 10 is circular when the terminal base portion 16 and the collecting plate 10 are joined to each other with the bolt 12 and the nut 13. Since the shape of the bolt flange 12a is polygonal, the bolt 12 is less likely to roll as compared to a bolt having a circular bolt flange. Therefore, the bolt 12 is easily prevented from rolling or rolling down during work. Further, since a diameter of the bolt shaft portion 12c facing the bolt through-hole 11 of the collecting plate 10 is uniformly narrowed when the terminal base portion 16 and the collecting plate 10 are joined to each other with the bolt 12 and the nut 13, displacement of the collecting plates 10 is prevented in any direction. In addition, since the cross-section of the bolt shaft portion 12c is circular, the force applied to the bolt 12 by fastening is easily distributed.

Tenth Embodiment

Figure 11:
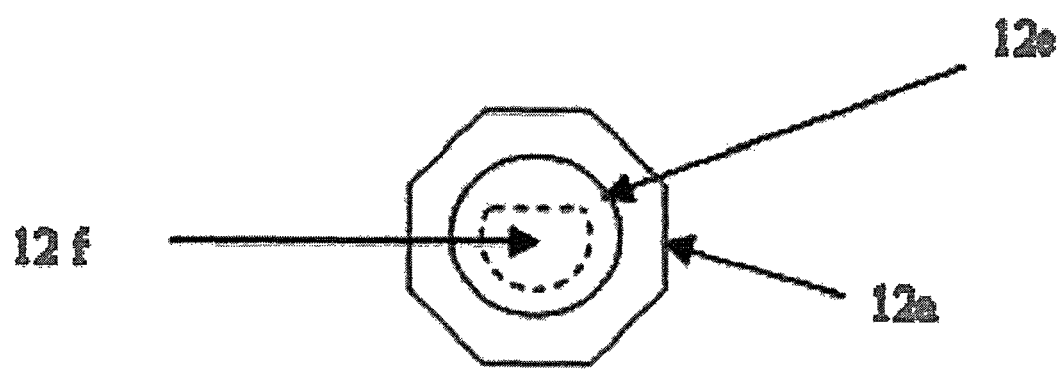
FIG. 11 is a view showing one example of the cross-section of the bolt.

FIG. 11 shows the bolt 12 in which the bolt flange 12a is polygonal and the cross-sectional shape of the bolt shaft portion 12c is circular, and in which the bolt shaft portion 12c facing the bolt through-hole 11 of the collecting plate 10 is partially narrowed when the terminal base portion 16 and the collecting plate 10 are joined to each other with the bolt 12 and the nut 13. Since the shape of the bolt flange 12a is polygonal, the bolt 12 is less likely to roll as compared to a bolt having a circular bolt flange. Since a diameter of the bolt shaft portion 12c facing the bolt through-hole 11 of the collecting plate 10 is only partially narrowed, when the terminal base portion 16 and the collecting plate 10 are joined to each other with the bolt 12 and the nut 13, the bolt shaft portion 12c is thicker than when a diameter of the bolt shaft portion 12c facing the bolt through-hole 11 of the collecting plate 10 is uniformly narrowed, which results in obtaining higher strength easily.

Eleventh Embodiment

Figure 12:
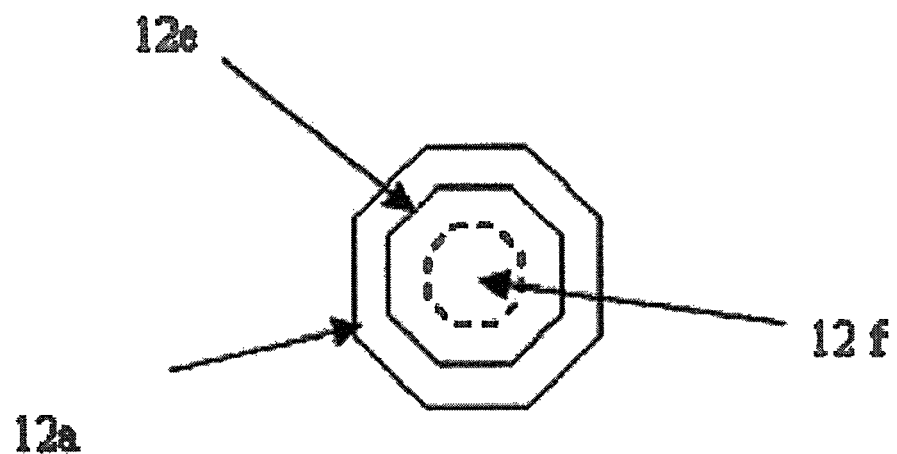
FIG. 12 is a view showing one example of the cross-section of the bolt.

FIG. 12 shows the bolt 12 in which the cross-sections of the bolt flange 12a and the bolt shaft portion 12c are polygonal, and in which the cross-sectional shape of the bolt shaft portion 12c facing the bolt through-hole 11 of the collecting plate 10 is circular when the terminal base portion 16 and the collecting plate 10 are joined to each other with the bolt 12 and the nut 13. Since the cross-sections of the bolt flange 12a and the bolt shaft portion 12c are polygonal, the bolt 12 is less likely to roll as compared to a bolt having a circular bolt flange. Therefore, the bolt 12 is easily prevented from rolling or rolling down during work. Further, since a diameter of the bolt shaft portion 12c facing the bolt through-hole 11 of the collecting plate 10 is uniformly narrowed when the terminal base portion 16 and the collecting plate 10 are joined to each other with the bolt 12 and the nut 13, displacement of the collecting plates 10 is prevented in any direction.

Twelfth Embodiment

Figure 13:
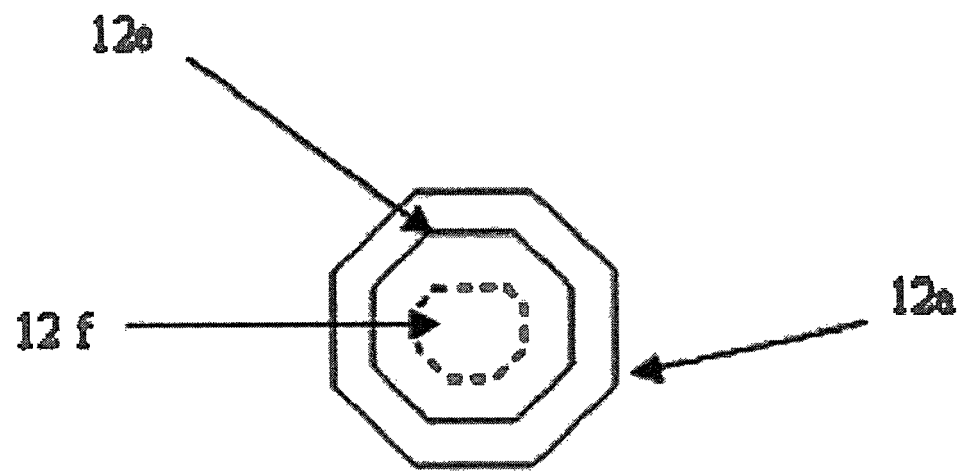
FIG. 13 is a view showing one example of the cross-section of the bolt.

FIG. 13 shows the bolt 12 in which the cross-sections of the bolt flange 12a and the bolt shaft portion 12c are polygonal, and in which the bolt shaft portion 12c facing the bolt through-hole 11 of the collecting plate 10 is partially narrowed when the terminal base portion 16 and the collecting plate 10 are joined to each other with the bolt 12 and the nut 13. Since the cross-sections of the bolt flange 12a and the bolt shaft portion 12c are polygonal, the bolt 12 is less likely to roll as compared to a bolt having a circular bolt flange. Therefore, the bolt 12 is easily prevented from rolling or rolling down during work. When the terminal base portion 16 and the collecting plate 10 are joined to each other with the bolt 12 and the nut 13, the bolt shaft portion 12c is thicker than when a diameter of the bolt shaft portion 12c facing the bolt through-hole 11 of the collecting plate 10 is uniformly-narrowed, which results in obtaining higher strength easily.

Thirteenth Embodiment

Figure 14:
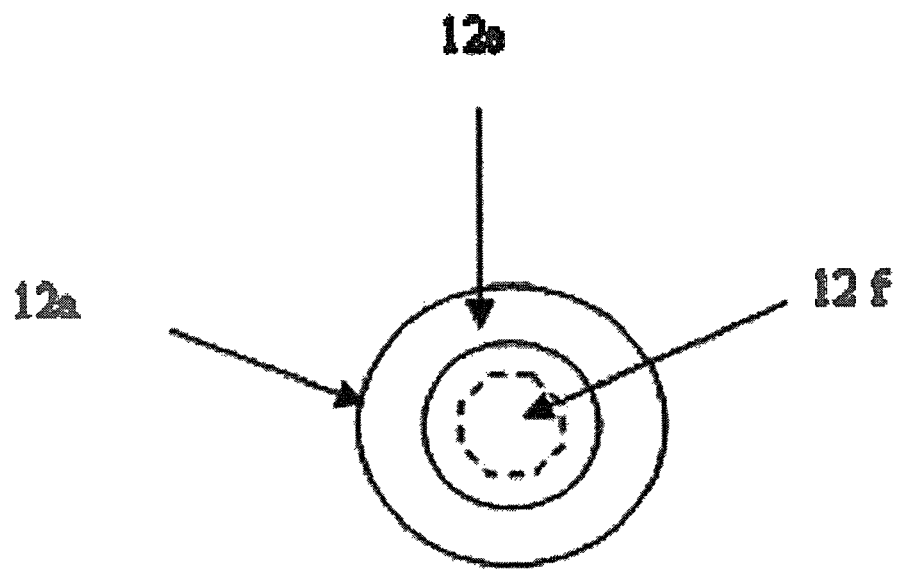
FIG. 14 is a view showing one example of the cross-section of the bolt.

FIG. 14 shows the bolt 12 in which the bolt flange 12a is circular and in which the cross-sectional shape of the bolt shaft portion 12c facing the bolt through-hole 11 of the collecting plate 10 is circular when the bolt shaft portion 12c, and the terminal base portion 16 and the collecting plate 10 are joined to each other with the bolt 12 and the nut 13. Since a diameter of the bolt shaft portion 12c facing the bolt through-hole 11 of the collecting plate 10 is uniformly narrowed when the terminal base portion 16 and the collecting plate 10 are joined to each other with the bolt 12 and the nut 13, displacement of the collecting plates 10 is prevented in any direction. In addition, since the cross-section of the bolt shaft portion 12c is circular, the force applied to the bolt 12 by fastening is easily distributed.

Fourteenth Embodiment

Figure 15:
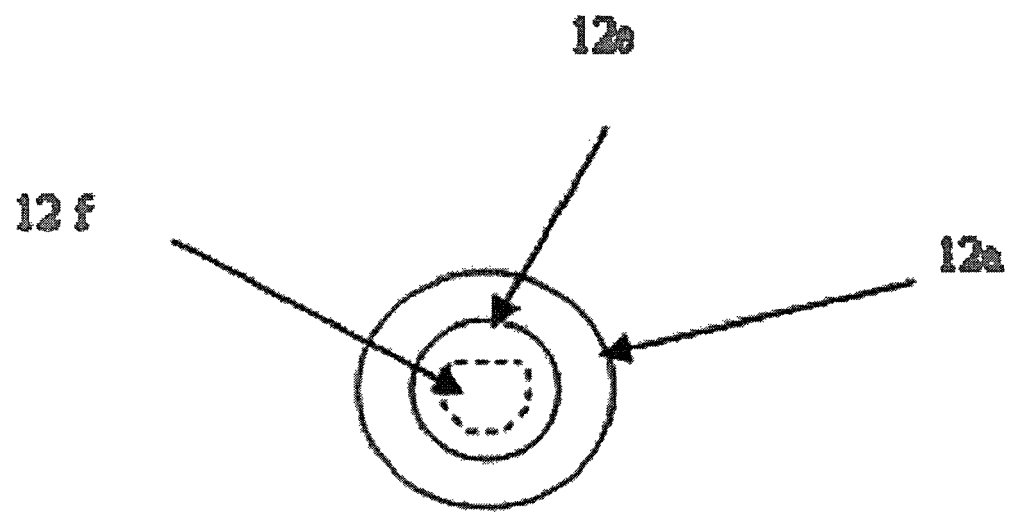
FIG. 15 is a view showing one example of the cross-section of the bolt.

FIG. 15 shows an example of the bolt 12 in which the cross-sections of the bolt flange 12a and the bolt shaft portion 12c are circular and in which the bolt shaft portion 12c facing the bolt through-hole 11 of the collecting plate 10 is partially narrowed when the terminal base portion 16 and the collecting plate 10 are joined to each other with the bolt 12 and the nut 13. Since the cross-section of the bolt shaft portion 12c is circular, the force applied to the bolt 12 by fastening is easily distributed. In addition, since a diameter of the bolt shaft portion 12c facing the bolt through-hole 11 of the collecting plate 10 is only partially narrowed, when the terminal base portion 16 and the collecting plate 10 are joined to each other with the bolt 12 and the nut 13, the bolt shaft portion 12c is thicker than when a diameter of the bolt shaft portion 12c facing the bolt through-hole 11 of the collecting plate 10 is uniformly narrowed, which results in obtaining higher strength easily.

Fifteenth Embodiment

Figure 16:
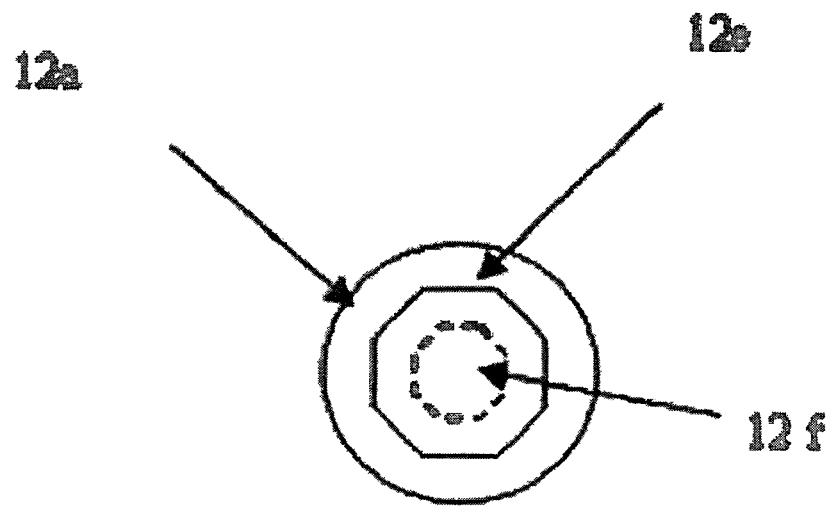
FIG. 16 is a view showing one example of the cross-section of the bolt.

FIG. 16 shows the bolt 12 in which the bolt flange 12a is circular and the cross-section of the bolt shaft portion 12c is polygonal, and in which the cross-sectional shape of the bolt shaft portion 12c facing the bolt through-hole 11 of the collecting plate 10 is circular when the terminal base portion 16 and the collecting plate 10 are joined to each other with the bolt 12 and the nut 13. Since the cross-section of the bolt shaft portion 12c is polygonal, the bolt 12 is less likely to roll as compared to the example shown in FIG. 14. Since a diameter of the bolt shaft portion 12c facing the bolt through-hole 11 of the collecting plate 10 is uniformly narrowed when the terminal base portion 16 and the collecting plate 10 are joined to each other with the bolt 12 and the nut 13, displacement of the collecting plates 10 is prevented in any direction.

Sixteenth Embodiment

Figure 17:
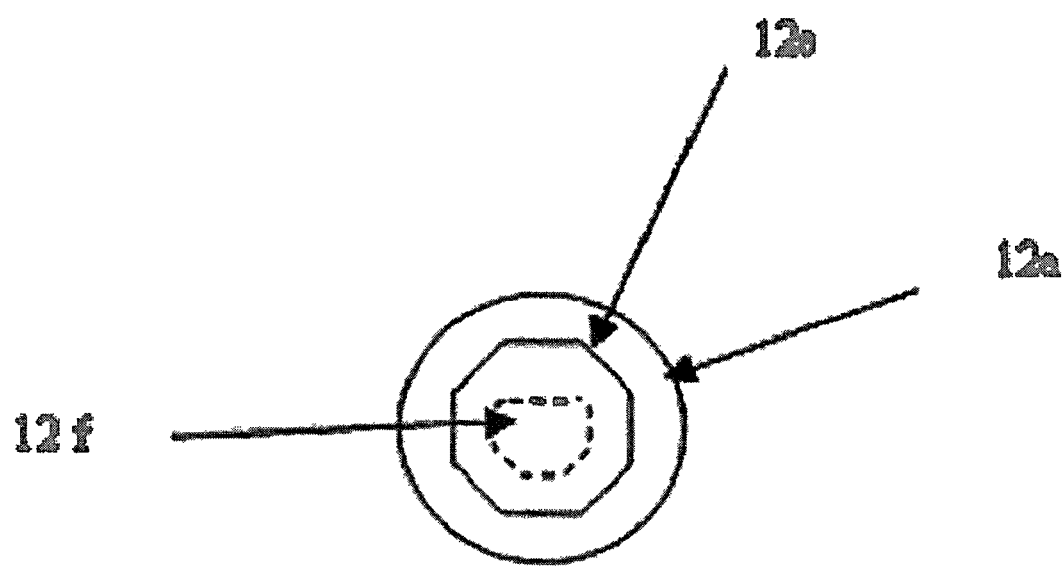
FIG. 17 is a view showing one example of the cross-section of the bolt.

FIG. 17 shows an example of the bolt 12 in which the bolt flange 12a is circular and the cross-section of the bolt shaft portion 12c is polygonal, and in which the bolt shaft portion 12c facing the bolt through-hole 11 of the collecting plate 10 is partially narrowed when the terminal base portion 16 and the collecting plate 10 are joined to each other with the bolt 12 and the nut 13. Since the cross-section of the bolt shaft portion 12c is polygonal, the bolt 12 is less likely to roll as compared to the example shown in FIG. 14. Since a diameter of the bolt shaft portion 12c facing the bolt through-hole 11 of the collecting plate 10 is only partially narrowed, when the terminal base portion 16 and the collecting plate 10 are joined to each other with the bolt 12 and the nut 13, the bolt shaft portion 12c is thicker than when a diameter of the bolt shaft portion 12c facing the bolt through-hole 11 of the collecting plate 10 uniformly narrowed, which results in obtaining higher strength easily.

The shape in FIG. 10 is most preferred because displacement of the collecting plates 10 occurring when a plurality of collecting plates 10 are stacked is widely prevented and the force acting on the bolt 12 upon fastening can be distributed, and further, the bolt 12 is easily prevented from rolling or rolling down. Next, the shapes in FIGS. 14, 12, 16, 11 and 15, etc., are preferred in order of such figures.

Since it is preferred that a load during fastening is less locally concentrated, the most preferred cross-sectional shape of the contacting surface between the bolt shaft portion 12c and the collecting plate 10 is circular and the most preferred shape of the bolt shaft portion 12c is also circular, and the next preferred shapes thereof are polygonal, etc.

As a method of preventing displacement occurring when the collecting plates 10 are stacked, narrowing a part of the bolt shaft portion 12c is desired as described above, but the displacement can also be prevented by making a diameter of the bolt through-hole 11 1.2 or more times larger than that of the bolt shaft portion 12c.

The shape of the bolt through-hole 11 may be different from the shape of the bolt shaft portion 12c. Therefore, even when the bolt shaft portion 12c is circular, for example, displacement of the collecting plates 10 in a longitudinal direction can be prevented with the bolt through-hole 11 having an elliptical shape, a cross-like shape, or other shapes as shown in FIG. 19 to FIG. 23.

Seventeenth Embodiment

Figure 18:
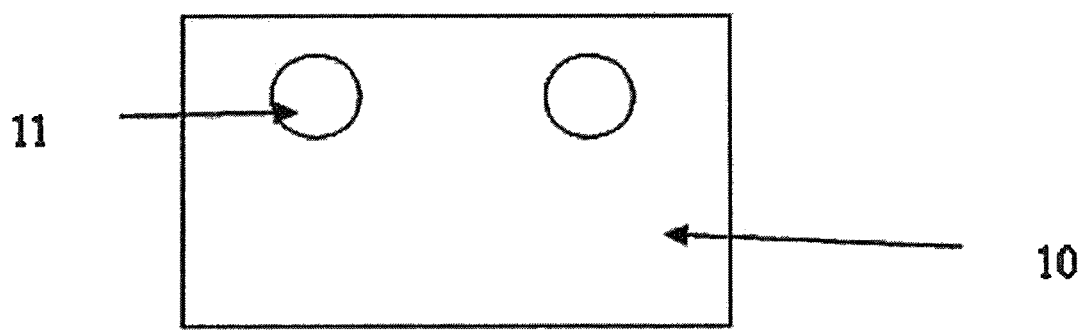
FIG. 18 is a view showing one example of a bolt through-hole.

FIG. 18 shows an example of the bolt through-hole 11 having a circular shape. Since the circular shape is hardly affected by the shape of the bolt shaft portion 12c, the displacement is prevented in any direction.

Eighteenth Embodiment

Figure 19:
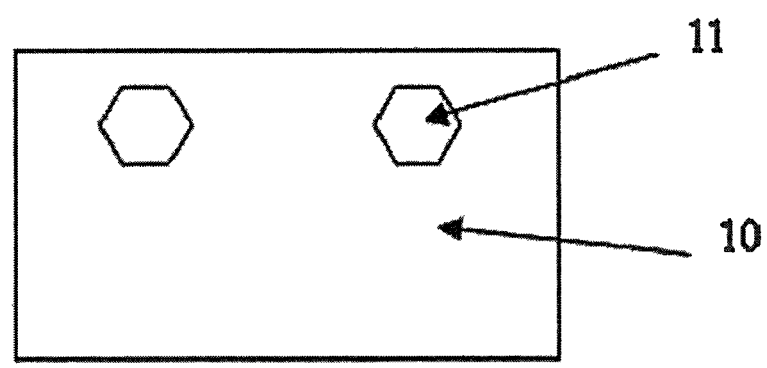
FIG. 19 is a view showing one example of the bolt through-hole.

FIG. 19 shows an example of the bolt through-hole 11 having a polygonal shape. The polygonal shape is more affected by the shape of the bolt shaft portion 12c than the circular shape, but less affected than a triangular or quadrilateral shape.

Nineteenth Embodiment

Figure 20:
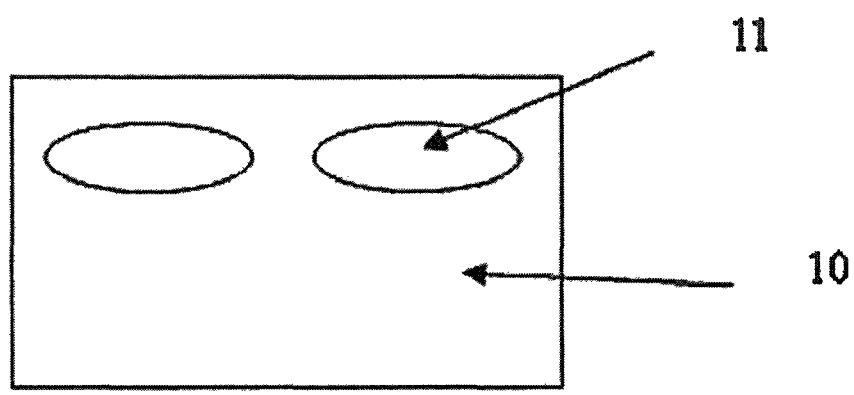
FIG. 20 is a view showing one example of the bolt through-hole.

FIG. 20 shows an example of the bolt through-hole 11 having an elliptical shape. The elliptical shape can prevent the displacement in a longitudinal direction. Though not shown in the figure, the bolt through-hole having a rectangular shape can similarly prevent the displacement in a longitudinal direction.

Twentieth Embodiment

Figure 21:
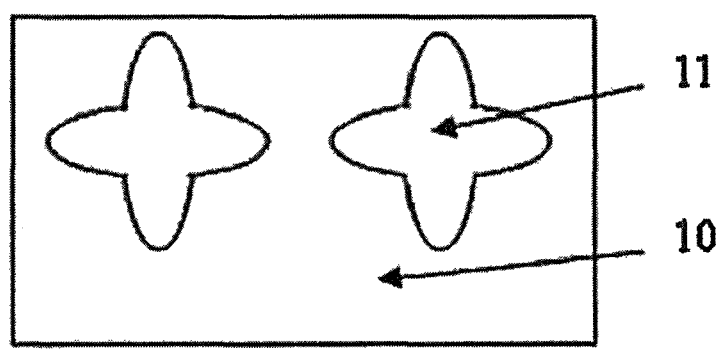
FIG. 21 is a view showing one example of the bolt through-hole.

FIG. 21 shows an example of the bolt through-hole 11 having a cross-like shape. The cross-like shape can prevent the displacement in a vertical direction and a horizontal direction.

Twenty-First Embodiment

Figure 22:
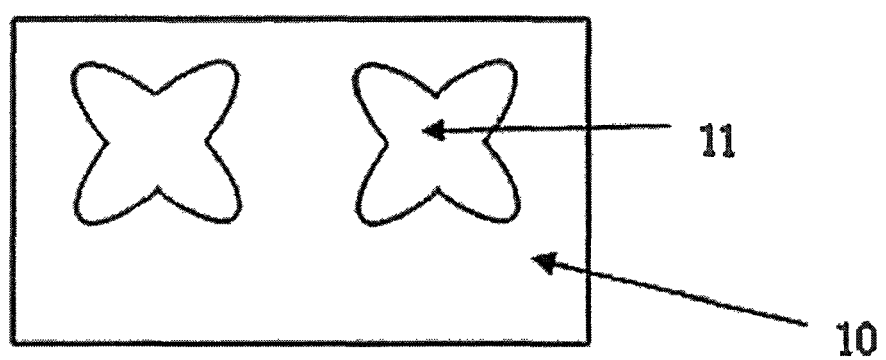
FIG. 22 is a view showing one example of the bolt through-hole.

FIG. 22 shows an example of the bolt through-hole 11 having a shape that can prevent the displacement in a diagonal direction. Though not shown in the figure, the shape or size of the bolt through-hole 11 is applied not only to the collecting plate 10 but also to the pressing plate 14 and the terminal base portion 16. Further, the shapes or sizes of the bolt through-holes 11 of the pressing plate 14, the collecting plate 10, and the terminal base portion 16 are all equal to each other.

It should be noted that, though a lithium-ion rechargeable battery has been taken as an example in the above embodiments, but the present invention is not limited thereto.

DESCRIPTION OF REFERENCES

1 . . . Battery container (battery can), 2 . . . Layered body, 2A . . . Negative plate, 2B . . . Positive plate, 3 . . . Electrode plate tab, 3A . . . Negative plate tab, 3B . . . Positive plate tab, 4 . . . Conducting member, 5 . . . Fastening member, 6 . . . Solution filling plug, 7 . . . Safety valve, 8 . . . Lid plate, 9 . . . Groove pattern, 10 . . . Collecting plate, 11 . . . Bolt through-hole, 12 . . . Bolt, 12a . . . Bolt flange, 12c . . . Bolt shaft portion, 12d . . . Bolt shaft narrowed portion, 12e . . . Contacting surface between bolt shaft portion and terminal base portion, 12f . . . Contacting surface between bolt shaft portion and collecting plate, 13 . . . Nut, 13a . . . First nut, 13b . . . Second nut, 14 . . . pressing plate, 15 . . . Electrode group, 16 . . . Terminal base portion.

The invention claimed is:

1. A rechargeable battery comprising:
an electrode group comprising a plurality of negative electrode collectors, each negative electrode collector having a negative active material layer formed on a surface, and a plurality of positive electrode collectors, each positive electrode collector having a positive active material layer formed on a surface, alternately disposed in a layered manner into a strip shape with a separator configured to retain an electrolyte interposed between adjacent negative and positive electrode collectors, a plurality of negative electrode plate tabs formed at ends of the plurality of negative electrode collectors, and a plurality of positive electrode plate tabs formed at ends of the plurality of positive electrode collectors;
a plurality of negative collecting plates joined to the plurality of negative electrode plate tabs and plurality of positive collecting plates joined to the plurality of positive electrode plate tabs; and
a negative terminal base portion having a through-hole for a bolt and a positive terminal base portion having a through-hole for a bolt;
wherein a plurality of the negative collecting plates are joined together and to the negative terminal base portion with pressing plates by a bolt, the bolt having a bolt flange and a bolt shaft portion, a portion of the bolt shaft portion passing through the through-hole of the negative terminal base, and at least one nut, and wherein a plurality of the positive collecting plates are joined together and to the positive terminal base portion with pressing plates by a bolt, the bolt having a bolt flange and a bolt shaft portion, a portion of the bolt shaft portion passing through the through-hole of the positive terminal base, and at least one nut;
wherein the negative and positive collecting plates comprise a metal, and
wherein the pressing plates comprise a metal or a resin.

2. The rechargeable battery according to claim 1, wherein the plurality of the negative collecting plates are joined together and to the negative terminal base portion with pressing plates by the bolt and two or more of the nuts, and the plurality of the positive collecting plates are joined together and to the positive terminal base portion with pressing plates by the bolt and two or more of the nuts.

3. The rechargeable battery according to claim 1, wherein a shape of the bolt flange is circular or polygonal, and a cross-sectional shape of the bolt shaft portion is circular or polygonal.

4. The rechargeable battery according to claim 1, wherein a diameter of a contacting surface between the bolt shaft portion and the collecting plate is narrower than a diameter of a contacting surface between the bolt shaft portion and the terminal base portion.

5. The rechargeable battery according to claim 4, wherein a shape of a bolt-shaft narrowed portion that is a contacting surface between the bolt shaft portion and the collecting plate is a shape having tapers.

6. The rechargeable battery according to claim 5,
wherein a cross-sectional area of a through-hole for the bolt in the contacting surface is equal to or less than one half of an area of the contacting surface.

7. The rechargeable battery according to claim 4,
wherein a cross-sectional area of a through-hole for the bolt in the contacting surface is equal to or less than one half of an area of the contacting surface.

8. The rechargeable battery according to claim 4,
wherein a shape of the bolt shaft portion is a circular shape or a shape having one or more corners.

9. The rechargeable battery according to claim 1,
wherein a shape of the bolt shaft portion is a circular shape or a shape having one or more corners.

10. The rechargeable battery according to claim 1,
wherein a fastening member including the bolt and the nut is made of a metal.

11. The rechargeable battery according to claim 1,
wherein a shape of a through-hole for the bolt is any of a circular shape, an elliptical shape, a polygonal shape having five or more corners, or a cross-like shape.

12. The rechargeable battery according to claim 11,
wherein a diameter of a through-hole for the bolt is 1.2 or more times larger than a diameter of the bolt shaft portion.

13. The rechargeable battery according to claim 1,
wherein a thickness of the pressing plate in a direction through which the bolt passes is 1 mm or more and 10 mm or less.

14. The rechargeable battery according to claim 1,
wherein the number of through-holes for the bolt disposed in the pressing plate is two or more, and an area of through-holes for the bolt is equal to or less than one half of an area of the pressing plate.

* * * * *